US011264916B2

(12) United States Patent
Bissal et al.

(10) Patent No.: US 11,264,916 B2
(45) Date of Patent: Mar. 1, 2022

(54) OPERATING A MODULAR MULTILEVEL CONVERTER

(71) Applicant: Maschinenfabrik Reinhausen GmbH, Regensburg (DE)

(72) Inventors: Ara Bissal, Regensburg (DE); Waqas Ali, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 17/291,634

(22) PCT Filed: Nov. 15, 2019

(86) PCT No.: PCT/EP2019/081487
§ 371 (c)(1),
(2) Date: May 6, 2021

(87) PCT Pub. No.: WO2020/104324
PCT Pub. Date: May 28, 2020

(65) Prior Publication Data
US 2021/0376757 A1 Dec. 2, 2021

(30) Foreign Application Priority Data

Nov. 19, 2018 (EP) .................... 18207074

(51) Int. Cl.
*H02M 7/483* (2007.01)
*H02M 1/32* (2007.01)
(52) U.S. Cl.
CPC ......... *H02M 7/4835* (2021.05); *H02M 1/327* (2021.05); *H02M 7/483* (2013.01)
(58) Field of Classification Search
CPC ..... H02M 7/4835; H02M 1/327; H02M 7/483
See application file for complete search history.

(56) References Cited

U.S. PATENT DOCUMENTS 9,413,260 B1 * 8/2016 Wu ................. H02M 7/483
2013/0113280 A1 * 5/2013 Yang ............... H02J 7/0016
307/19

(Continued)

OTHER PUBLICATIONS

Rohner, et al., "Modulation, Losses, and Semiconductor Requirements of Modular Multilevel Converters," *IEEE Transactions on Industrial Electronics* 54, 8, pp. 2633-2635, Aug. 1, 2010, Institute of Electrical and Electronics Engineers, Piscataway, NJ, USA.

(Continued)

*Primary Examiner* — Yusef A Ahmed
(74) *Attorney, Agent, or Firm* — Leydig, Voit & Mayer, Ltd.

(57) ABSTRACT

A method that operates a modular multilevel converter (MMC), includes controlling a plurality of submodules of an arm of the MMC for a plurality of subsequent periods. Each of the submodules has a capacitor. The controlling includes, for each of the subsequent periods: sampling a value of a reference voltage; determining an integer number n of submodules of the plurality of submodules required to approximate the sampled value; for each submodule of a subset of the n submodules of the plurality of submodules, determining a temperature characterizing the respective submodule; inserting all submodules of the subset of the n submodules except for one remaining submodule; determining, depending on the determined temperatures, a duty ratio; and inserting the one remaining submodule for a duration given by the duty ratio. A minimum temperature of the determined temperatures is identified and the duty ratio is determined depending on the minimum temperature.

13 Claims, 2 Drawing Sheets

(56) References Cited

U.S. PATENT DOCUMENTS

| | | | |
|---|---|---|---|
| 2013/0128643 A1* | 5/2013 | Shinohara | H05K 7/20927 |
| | | | 363/131 |
| 2014/0092654 A1* | 4/2014 | Casares | H02H 3/05 |
| | | | 363/56.01 |
| 2015/0124506 A1* | 5/2015 | Sahoo | H02M 5/225 |
| | | | 363/126 |
| 2016/0299195 A1* | 10/2016 | Guo | G01R 31/3648 |
| 2017/0054294 A1* | 2/2017 | Lyu | H02J 3/01 |
| 2017/0310270 A1* | 10/2017 | Sano | H02P 27/06 |
| 2017/0346407 A1* | 11/2017 | Kim | H02M 1/08 |
| 2018/0226898 A1* | 8/2018 | Shinoda | H02M 7/483 |
| 2018/0285197 A1* | 10/2018 | Kim | G06F 11/1048 |
| 2018/0331632 A1* | 11/2018 | Wang | H02M 7/483 |
| 2019/0109306 A1* | 4/2019 | Nishikawa | H01M 10/627 |
| 2019/0190399 A1* | 6/2019 | Shinoda | H02M 7/483 |
| 2019/0312504 A1* | 10/2019 | Kim | H02M 1/32 |
| 2020/0192759 A1* | 6/2020 | Hwang | G06F 11/102 |
| 2020/0335975 A1* | 10/2020 | Kim | F03D 13/30 |
| 2020/0336083 A1* | 10/2020 | Corzine | H02M 7/483 |
| 2021/0075337 A1* | 3/2021 | Tobayashi | H02M 1/32 |
| 2021/0249970 A1* | 8/2021 | Pieschel | H02M 1/126 |

OTHER PUBLICATIONS

Sangwongwanich, et al., "Two-Dimension Sorting and Selection Algorithm Featuring Thermal Balancing Control for Modular Multilevel Converters," *18th European Conference on Power Electronics and Applications*, pp. 1-10, Sep. 5, 2016, European Power Electronics and Drives Association, Auderghem, Belgium.

Pereira, et al., "Capacitor Voltage Balance Performance Comparison of MMC-Statcom Using NLC and PS-PWM Strategies During Negative Sequence Current Injection," *18th European Conference on Power Electronics and Applications*, pp. 1-9, Sep. 5, 2016, European Power Electronics and Drives Association, Auderghem, Belgium.

* cited by examiner

OPERATING A MODULAR MULTILEVEL CONVERTER

CROSS-REFERENCE TO PRIOR APPLICATIONS

This application is a U.S. National Phase Application under 35 U.S.C. § 371 of International Application No. PCT/EP2019/081487, filed on Nov. 15, 2019, and claims benefit to European Patent Application No. EP 18207074.8, filed on Nov. 19, 2018. The International Application was published in English on May 28, 2020 as WO 2020/104324 under PCT Article 21(2).

FIELD

The present invention relates to a modular multilevel converter and to a method for operating such.

BACKGROUND

Modular multilevel converters, MMC, may represent an enabling technology for example in the field of medium and high voltage power transmission. The scalability and excellent output waveforms of MMCs even at low frequencies are particularly advantageous.

To control an MMC, for example carrier based pulse width modulation, PWM, schemes may be used, for example phase shifted carrier, PSC, PWM. These schemes may, however, suffer from relatively high switching losses, which may be particularly unfavorable in case of a medium or large number of cells per converter arm. On the other hand, carrier-less sorting schemes, such as nearest level control, NLC, may only achieve a reduced accuracy, in particular for a low to medium number of cells per arm. The reduced accuracy may in particular lead to an increased total harmonic distortion, THD. NLC as well as other approaches may involve a thermal imbalance amongst the cells within one arm, which may lead to overall reduced lifetime and reliability or even a destruction of the MMC.

SUMMARY

In an embodiment, the present invention provides a method that operates a modular multilevel converter (MMC), which includes controlling a plurality of submodules of an arm of the MMC for a plurality of subsequent periods. Each of the submodules has a capacitor. The controlling includes, for each of the subsequent periods: sampling a value of a reference voltage; determining an integer number n of submodules of the plurality of submodules required to approximate the sampled value; for each submodule of a subset of the n submodules of the plurality of submodules, determining a temperature characterizing the respective submodule; inserting all submodules of the subset of the n submodules except for one remaining submodule; determining, depending on the determined temperatures, a duty ratio; and inserting the one remaining submodule for a duration given by the duty ratio. A minimum temperature of the determined temperatures is identified and the duty ratio is determined depending on the minimum temperature.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1A:
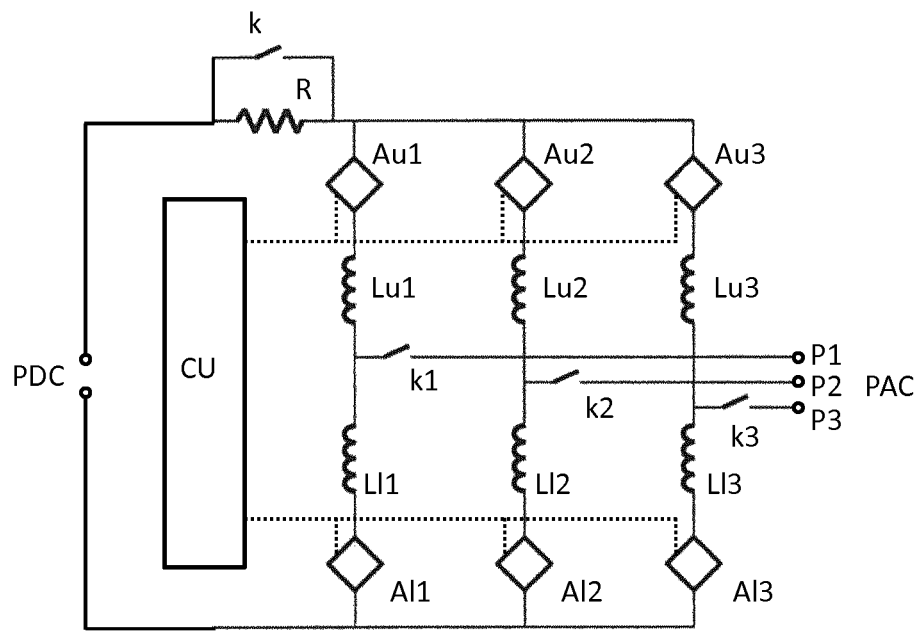
FIG. 1a shows a block diagram of an exemplary implementation of an MMC according to the improved concept.

Embodiments of the present invention provide an improved concept for operating an MMC that provides reduced switching losses without reducing the MMC accuracy or lifetime.

The improved concept is based on the idea to operate an MMC according to a modulation scheme by applying a modified nearest level control, NLC, procedure. Therein, all but one submodule are inserted according to an NLC scheme, while the remaining submodule is inserted according to a pulse width modulation, PWM, scheme with a duty ratio depending on temperatures associated to the submodules.

In this way, the advantages of NLC may be achieved while its disadvantages are widely avoided without giving rise to a significant temperature imbalance.

According to the improved concept, a method for operating a modular multilevel converter is provided. The method comprises controlling a plurality of submodules of an arm of the MMC for a plurality of subsequent periods. Each of the plurality of submodules comprises a respective capacitor. The controlling includes for each of the periods sampling a value of a reference voltage and determining an integer number n of submodules of the plurality of submodules required to approximate the sampled value of the voltage. A subset of n submodules is selected from the plurality of submodules. For each submodule of the subset, a temperature is determined, wherein the temperature characterizes the respective submodule. Then, all but one submodule, that is n−1 submodules, of the subset are inserted into the arm, in particular for the whole respective period. The n-th submodule is denoted as remaining submodule. Depending on the determined temperatures, a duty ratio for the remaining submodule is determined. Then, the remaining submodule is inserted into the arm for a duration given by the duty ratio. In particular, the duration for which the remaining submodule is inserted is given by a product of the duty ratio and a duration of the respective time period.

Herein, approximating the sampled value of the voltage means determining a voltage level achievable for the arm, which is equal to or greater than the sampled value of the voltage, that is approximating the sampled value from above.

According to several implementations of the method, the duty ratio is determined such that a total voltage across all capacitors of the n submodules of the subset of submodules matches the sampled reference voltage, for example up to a tolerance value.

By inserting all but the remaining submodule for the whole period and the remaining submodule for the duration given by the duty ratio, the disadvantage of limited accuracy of known carrier-less schemes is avoided. Said limited accuracy originates from the fact that the sampled voltage in general does not match the total voltage drop across all n capacitors exactly. Since an appropriately adjusted duty ratio may be used for inserting the remaining submodule, the voltage match and thus the accuracy of the MMC may be significantly improved. For the same reason, the average switching rate is reduced for the plurality of submodules as a whole. Thus, switching losses are reduced, in particular with respect to PSC PWM.

Herein, inserting a submodule means to connect the capacitor of the respective submodule such that the capacitor is electrically connected in series between an input terminal and an output terminal of the submodule. For a submodule at an end of the arm, this means that the capacitor is electrically connected in series between an adjacent submodule and the end of the arm. For other submodules, this means that the capacitor is electrically connected in series between two adjacent submodules.

According to several implementations, the integer number n is determined depending on the sampled value of the reference voltage and respective rated voltages of the capacitors. In particular, if the rated voltages of all capacitors are the same, the integer number n is given by a ratio of the sampled value to the rated voltage value, the ratio rounded up to the next larger integer number. In particular, if the rated voltage values of the capacitors differ from each other, the integer number n is given by a ratio of the sampled value to an average of the rated voltage values, the ratio rounded up to the next larger integer number.

According to several implementations, the method comprises sorting the plurality of submodules according to the voltages across their respective capacitors either in ascending or in descending order and generating a sorted list of submodules based on the sorting. The subset of n submodules corresponds to the first n entries of the sorted list According to several implementations, the subset of submodules corresponds either to n entries, that is submodules of the plurality of submodules, of the sorted list with the lowest voltages across their respective capacitors or to n entries of the sorted list with the highest voltages across their respective capacitors depending on a direction of a current flowing in the arm. In particular, if capacitors of inserted submodules are charged or would be charged if inserted, the subset corresponds to the n entries with lowest capacitor voltages, and if capacitors of inserted submodules are discharged or would be discharged if inserted, the subset corresponds to the n entries with highest capacitor voltages. In this way, an imbalance of voltages of inserted submodules may be minimized.

According to several implementations, a minimum temperature of the determined temperatures is identified and the duty ratio is determined depending on the minimum temperature.

According to several implementations, each submodule of the plurality of submodules comprises a switching arrangement for inserting, bypassing and/or blocking the respective submodule.

According to several implementations, the temperature characterizing the respective submodule is given by a junction temperature of a switching element of the respective submodule, in particular of the switching arrangement of the respective submodule.

According to several implementations, the switching arrangement of one of the plurality of submodules, in particular of each of the plurality of submodules, comprises a first switching element and a second switching element. The first and the second switching elements and the capacitor of the respective submodule are arranged according to a half-bridge topology.

According to several implementations, the second switching element is arranged in parallel to a series arrangement of the first switching element and the capacitor.

According to several implementations, the switching arrangement of one of the plurality of submodules, in particular of each of the plurality of submodules, comprises a third switching element and a fourth switching element. The first, second, third and fourth switching elements and the capacitor of the respective submodule are arranged according to a full-bridge topology.

According to several implementations, the temperature characterizing the respective submodule is given by a junction temperature of a switching element of the respective submodule, which has a minimum junction temperature with respect to all other switching elements of the same submodule.

According to several implementations the temperature characterizing the respective submodule is given by a junction temperature of the first switching element of the respective submodule.

According to several implementations the temperature characterizing the respective submodule is given by a junction temperature of the second switching element of the respective submodule.

Which junction temperature represents the characterizing temperature of a submodule may for example depend on a specific application, an operating mode, and/or a load of the MMC. For example, if a switching rate of the second switching element is significantly higher than a switching rate of the first switching element, for example in a half bridge topology, the junction temperature of the second switching element may represent the characterizing temperature or vice versa.

The junction temperature may for example be determined by means of a temperature measurement, for example using an on-chip sensing diode. Alternatively or in addition, the junction temperature may be determined based on a measurement of a temperature sensitive electrical parameter, TSEP, or a based on a thermal model.

In an MMC which supplies a load with power, inserting all but the remaining submodule for the whole period and the remaining submodule for the duration given by the duty ratio may in principle thermally stress certain switching elements more than others. By using the temperature dependent duty ratio for the remaining submodule, such imbalance may be avoided or reduced.

According to several implementations, for inserting one of the plurality of submodules, the first switching element of the respective submodule is closed and the second switching element of the respective submodule is opened, such that the capacitor of the respective submodule may be charged and discharged depending on the direction of the current in the arm. If a submodule is inserted, current may flow from an input terminal of the submodule via the first switch to the capacitor of the submodule and from the capacitor to an output terminal of the submodule for charging the capacitor. For discharging the capacitor, the current flow may be inverted.

According to several implementations, for bypassing one of the plurality of submodules, the first switching element of the respective submodule is opened and the second switching element of the respective submodule is closed, such that the capacitor of the respective submodule is effectively disconnected from the arm.

According to several implementations, for blocking one of the plurality of submodules, the first and the second switching element of the respective submodule are both opened. In case the first switching element comprises a freewheeling diode, the capacitor of the respective submodule may be charged or not, depending on the direction of the current in the arm.

Herein, an open switching element is meant to be in an off-state, that is in a high-resistance state. Further, a closed switching element is meant to be in an on-state, that is in a low-resistance state. It is noted that the term opening a switching element also includes keeping the switching element open. Analogously, the term closing a switching element also includes keeping the switching element closed.

According to several implementations, the method further comprises determining a temperature difference between a minimum temperature of the determined temperatures characterizing the submodules and the determined temperature characterizing a reference submodule of the sorted list. The reference submodule may for example correspond to the n-th submodule of the sorted list. The remaining submodule is given by the submodule for which the minimum temperature has been determined if the temperature difference is greater than a predetermined threshold value.

According to several implementations, the remaining submodule is given by the reference submodule if the temperature difference is smaller than the predetermined threshold value.

According to several implementations, the duty ratio is determined according to the following equation, if the temperature difference is greater than the predetermined threshold value:

$$d = \frac{V_{ref} - \sum_{i=1}^{n} V_i - V_{min}}{V_{min}}, \quad (1)$$

wherein d is the duty ratio, $V_{ref}$ is the sampled value of the reference voltage, the sum runs over all submodules of the subset of submodules, $V_i$ is the voltage across the capacitor of the i-th submodule and $V_{min}$ is the voltage across the capacitor of the submodule for which the minimum temperature has been determined.

According to several implementations, the duty ratio is determined according to the following equation, if the temperature difference is equal to or smaller than the predetermined threshold value:

$$d = \frac{V_{ref} - \sum_{i=1}^{n} V_i - V_r}{V_r}, \quad (2)$$

wherein $V_r$ is the voltage across the capacitor of the reference submodule.

According to several implementations, the duty ratio is determined according to equation (2) if equation (1) would result in a negative duty ratio.

According to several implementations, the remaining submodule is given by the reference submodule if equation (1) would result in a negative duty ratio.

According to several implementations, the predetermined threshold value in in the order of several tenth of a Kelvin or in the order of one or several Kelvin.

According to the improved concept, also a modular multilevel converter is provided. The MMC comprises a control unit and an arm with a plurality of submodules, wherein the submodules of the plurality of submodules are in particular arranged in series to each other. Each of the plurality of submodules comprises a respective capacitor. The control unit is configured, for each of a plurality of subsequent periods, to sample a value of a reference voltage and determine an integer number n of submodules of the plurality of submodules required to approximate the sampled value. The control unit is further configured to determine a temperature characterizing the respective submodule for each of a subset of n submodules of the plurality of submodules. The control unit is further configured to insert all submodules of the subset of n submodules except for one remaining submodule into the arm and to determine a duty ratio depending on the determined temperatures and to insert the remaining submodule into the arm for a duration given by the duty ratio.

According to several embodiments of the MMC, each of the plurality of submodules comprises a respective switching arrangement designed for inserting, bypassing and blocking the respective submodule.

According to several embodiments of the MMC, each switching arrangement comprises a first and a second switching element. The first and the second switching elements and the respective capacitor of one of the submodules are arranged according to a half-bridge topology.

According to several embodiments of the MMC, the control unit is configured to close the first switching element and open the second switching element of the respective submodule such that the capacitor of the respective submodule may be charged or discharged in order to insert the respective submodule.

According to several embodiments of the MMC, the control unit is configured to open the first switching element and close the second switching element of the respective submodule such that the capacitor of the respective submodule is disconnected from the arm in order to bypass the respective submodule.

According to several embodiments of the MMC, the control unit is configured to open the first and the second switching elements of the respective submodule in order to block the respective submodule.

According to several embodiments of the MMC, the switching arrangement of one of the submodules, in particular the first and/or the second switching element, comprises at least one insulated gate bipolar transistor, IGBT.

According to several embodiments of the MMC, the control unit comprises a gate drive for controlling the switching arrangements, in particular the switching elements, for example the IGBTs.

Further implementations and embodiments of the MMC according to the improved concept follow readily from the various implementations and embodiments of the method according to the improved concept and vice versa. In particular, individual or several components or arrangements described with respect to the MMC may be implemented accordingly for a method according to the improved system.

In the following, the invention is explained in detail with respect to exemplary implementations by reference to the drawings. Components that are functionally identical or have an identical effect may be denoted by identical reference signs. Identical components or components with identical functions or effects may be described only with respect to the figure where they occur first. Their description is not necessarily repeated in subsequent figures.

FIG. 1a shows a block diagram of an exemplary implementation of an MMC according to the improved concept. The MMC comprises several, in the particular non-limiting example three, upper arms Au1, ... Au3, and equally many, in the particular non-limiting example three, lower arms Al1, Al2, Al3. Respective pairs of upper and lower arms are coupled in series, for example Au1/Al1, Au2/Al2 and Au3/Al3. A respective terminal P1, P2, P3 of an AC port PAC of the MMC is connected between each of the series connected arms. In the shown example, a respective upper inductive component Lu1, Lu2, Lu3 is connected between each of the upper arms Au1, Au3 and the respective terminal P1, P2, P3. Analogously, a respective lower inductive component Ll1, Ll2, Ll3 is connected between each of the lower upper arms Al1, ... Al3 and the respective terminal P1, P2, P3. Each pair of series connected upper and lower arms Au1/Al1, Au2/Al2, Au3/Al3 forms, together with the respective upper and lower inductive components Lu1/Ll1, Lu2/Ll2, Lu3/Ll3, a leg of the MMC.

Alternatively or in addition, to the upper and lower inductive components Lu1, ... , Lu3, Ll1, ... Ll3, a respective inductive component may be connected between each of the terminals P1, P2, P3 and the respective leg.

Optionally, the MMC may comprise a respective switch k1, k2, k3 arranged between each of the legs and the respective terminal P1, P2, P3 to disconnect the respective leg from the respective terminal P1, P2, P3.

The upper arms Au1, Au2, Au3 are connected to each other and to a DC port PDC. The lower arms Al1, Al2, Al3 are connected to each other and to the DC port PDC.

The MMC further comprises a resistor R coupled between the upper arms Au1, Au2, Au3 and the DC port PDC. Alternatively, the resistor R may be coupled between the lower arms Al1, Al2, Al3 and the DC port PDC or a further resistor may be coupled between the lower arms Al1, Al2, Al3 and the DC port PDC.

Optionally, the MMC comprises a further switch k for bypassing the resistor R.

The MMC comprises a control unit CU coupled to each of the arms Au1, ... Au3, Al1, ... , Al3. Optionally, the control unit CU may be coupled to the switches k, k1, ... k3 for opening and closing each of them.

Figure 1B:
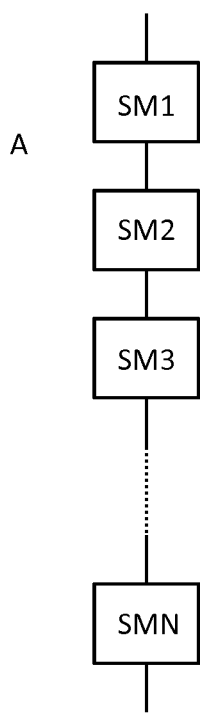
FIG. 1b shows a block diagram of an arm of a further exemplary implementation of an MMC according to the improved concept.

FIG. 1b shows a block diagram of an arm A of a further exemplary implementation of an MMC according to the improved concept. For example, the arm A may represent one of the arms Au1, ... Au3, Al1, ... , Al3 shown in FIG. 1a.

The arm A comprises a plurality of submodules SM1, SM2, SM2, SMN coupled in series to each other. The number of four submodules shown is to be understood as a non-limiting example. In particular, according to implementations of the improved concept, the arm A may comprise any number of submodules equal to or greater than two, as indicated by the dotted lines in FIG. 1b.

Figure 1C:
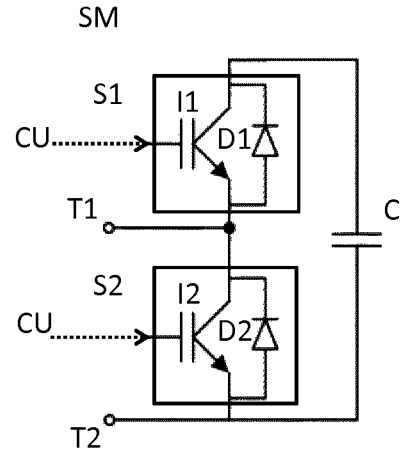
FIG. 1c shows a block diagram of a submodule of a further exemplary implementation of an MMC according to the improved concept.

FIG. 1c shows a block diagram of a submodule SM of a further exemplary implementation of an MMC according to the improved concept. For example, the submodule SM may represent one of the submodules SM1, SMN shown in FIG. 1b.

As a non-limiting example, the submodule SM is implemented according to a half-bridge topology. According to other embodiments, the submodule may be implemented differently, for example according to a full-bridge topology.

According to the half bridge topology, the submodule comprises a capacitor C with one terminal coupled to an input terminal T1 of the submodule SM via a first switching element S1. Another terminal of the capacitor C is coupled to an output terminal T2 of the submodule. A second switching element S2 is connected between the input terminal T1 and the output terminal T2.

The first and the second switching elements S1, S2 may for example each comprise a respective transistor I1, I2, for example an insulated gate bipolar transistor, IGBT. The transistors I1, I2 are depicted in FIG. 1c as normally-on n-type transistors. As obvious for the skilled reader, other choices are possible as well.

The first switching element S1 may be connected to the capacitor via a collector terminal of the first transistor I1 and to the input terminal T1 via an emitter terminal of the first transistor I1. Optionally, a first diode D1 may be connected to the first transistor T1 such that a cathode of the diode D1 is connected to the collector terminal of the first transistor T1 and an anode of the diode D1 is connected to the emitter terminal of the first transistor T1. The second switching element S2 may be connected to the capacitor via an anode terminal of the second transistor I2 and to the input terminal T1 via a collector terminal of the second transistor I2. Optionally, a second diode D2 may be connected to the second transistor T2 such that a cathode of the diode D2 is connected to the collector terminal of the second transistor T2 and an anode of the diode D2 is connected to the emitter terminal of the second transistor T2. Respective gate terminals of the transistors T1, T2 are coupled to and may be controlled by the control unit CU.

The input terminal T1 is for example coupled to the AC port PAC or the respective inductive element of the arm either directly or via one or more other submodules of the same arm, depending on the location of the particular submodule within the series connection of submodules. The output terminal T2 is for example coupled to the DC port PDC either directly or via the resistor R and/or via one or more other submodules of the same arm, depending on the location of the particular submodule within the series connection of submodules.

During operation of the MMC, the steps described in the following with respect to a given sample period are carried out periodically. In the following, an operation mode is described, wherein the MMC is used to convert a three-phase AC input voltage applied at the AC port PAC to an output voltage supplied at the DC output port PDC. Analogously, the MMC may be used to convert an input DC input voltage applied at the DC port PDC to an output voltage supplied at the AC port PAC. Furthermore, the following description is directed mostly to a submodule of the first upper arm Au1 as a representative example. The operation with respect to the other arms of the MMC is analogous. It is assumed that all submodules of the first upper arm Au1 are implemented according to FIG. 1c, wherein all capacitors C of submodules within the arm Au1 have an identical rated voltage. Therein, the rated voltage is given by a predetermined maximum voltage allowed to charge the capacitor with and is typically given by a dielectric strength of the capacitor's dielectric.

In the sample period, a reference voltage applied at the terminal P1 of the AC port PAC is measured and supplied to the control unit CU. Then, the control unit CU determines how many submodules of the arm Au1 are required to approximate the sampled reference voltage. The number n of required submodules is for example given by $n=[V_{ref}/V_{rate}]^+$, wherein $V_{ref}$ is the absolute value of the sampled reference voltage, $V_{rate}$ is the rated voltage of the capacitors and $[\ldots]^+$ denotes the next greater integer number if the argument is non-integer and the argument itself otherwise.

The control unit CU then determines a subset of n submodules of the arm Au1. To this end, the control unit CU may set up a sorted list of the submodules of the arm Au1, the list sorted in ascending or descending order of the present voltage values across the capacitors of the submodules. Depending on a present current direction in the arm Au1, the subset consists of those n submodules with the highest or the lowest voltages across their capacitors in order to minimize or avoid an imbalance of capacitor voltages in the arm Au1. For example, in case inserting the modules in the arm Au1 would lead to a charging of their capacitors, those n submodules with lowest voltages across their capacitors constitute the subset of n submodules. On the other hand, in case inserting the modules in the arm Au1 would lead to a discharging of their capacitors, those n submodules with highest voltages across their capacitors constitute the subset of n submodules.

Then, for all n submodules of the subset, a temperature characterizing the respective submodule is determined and supplied to the control unit CU. The temperature may correspond to a junction temperature of a switching element of the respective submodule, for example of one of the transistors I1, I2. Depending on the specific application or mode of operation of the MMC, the characterizing temperature may be given by the junction temperature of the first transistor I1 or by the junction temperature of the second transistor I2 or by a minimum junction temperature of the first and second transistor's junction temperatures.

All but one submodule of the n submodules of the subset are then inserted in the arm Au1, in particular for the whole sample period, leaving one remaining submodule.

The remaining submodule may for example be determined based on the position in the sorted list. For example, the remaining submodule may be the n-th submodule in the sorted list. For example, in case the sorted list is sorted in ascending order with respect to the capacitor voltages, the remaining submodule may be the one with the largest capacitor voltage among the n submodules of the subset. For example, in case the sorted list is sorted in descending order with respect to the capacitor voltages, the remaining submodule may be the one with the smallest capacitor voltage among the n submodules of the subset.

The control unit CU may then determine a duty ratio for the remaining submodule depending on the determined temperatures. In this respect, it is referred to equations (1) and (2) above for details. It is pointed out that the minimum characterizing temperature is not necessarily identical to the lowest junction temperature among all transistors in the arm Au1. For example, considering a specific mode of operation or application of the MCC, for a given arm Au1 all first transistors I1 may have junction temperatures higher than all the junction temperatures of second transistors I2 in the arm Au1. If the characterizing temperature is given by the junction temperature of the first transistors I1, the minimum characterizing temperature may be greater than the junction temperature of second transistors I2.

The remaining submodule is then inserted according to the determined duty ratio, in particular for a duration given by a product of the sample period's duration and the duty ratio.

In this way, the sampled voltage may be approximated in a particularly accurate way with a particularly low switching rate of most submodules.

In the same way, all other arms Au2, Au3, Al1, Al2, Al3 are controlled. Therein, the remaining submodules of the several arms may for example be inserted according to predetermined phase shifts with respect to each other, for example according to a PSC type approach.

Figure 2A:
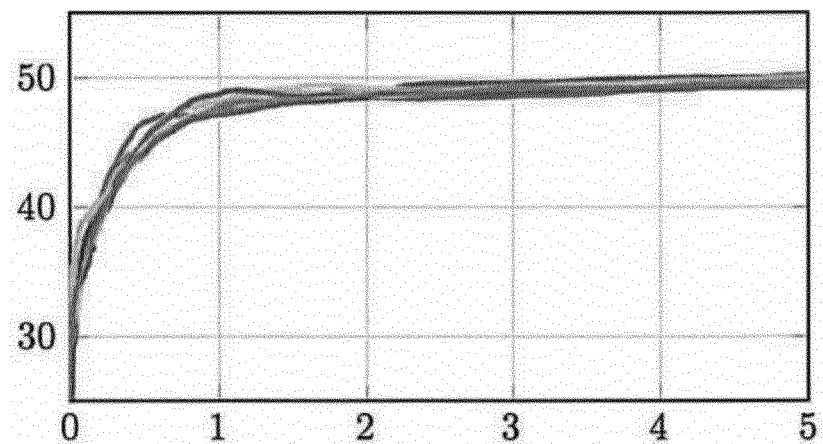
FIG. 2a shows a set of curves representing characteristic temperatures of submodules of a further exemplary implementation of an MMC according to the improved concept versus time.

FIG. 2a shows the characterizing temperatures in centigrade versus time in seconds of an arm of an MMC according to the improved concept.

In the shown example, equation (1) is used for determining the duty ratio, whenever the temperature difference between the characterizing temperature of the remaining submodule and the minimum characterizing temperature is larger than one centigrade, provided equation (1) delivers a positive result. Otherwise, equation (2) was used. One can see that the temperature differences of FIG. 2a are limited to 1 Kelvin.

Figure 2B:
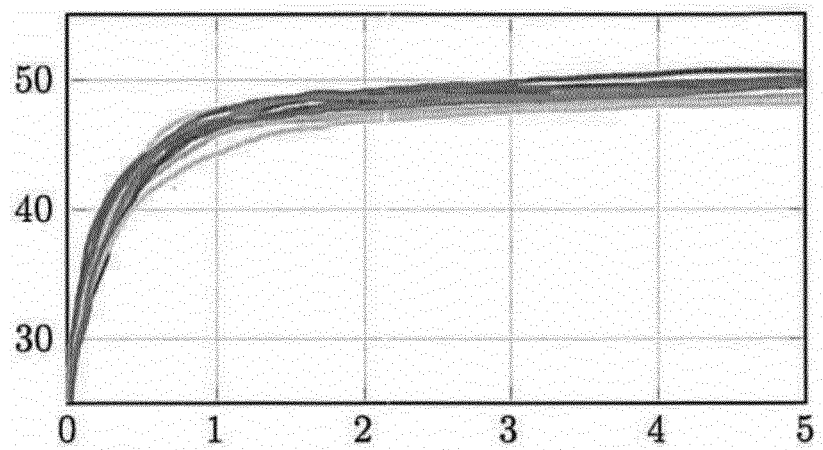
FIG. 2b shows a set of curves representing characteristic temperatures of submodules of an MMC versus time.

For comparison, FIG. 2b shows the characterizing temperatures in centigrade versus time in seconds of an arm of an MMC, wherein the duty ratio has not been determined in a temperature dependent way. Rather, only equation (2) has been used. Here, the temperature differences are significantly larger, namely up to approximately four Kelvin.

By means of an MMC or a method according to the improved concept, disadvantages of known approaches like PSC PWM and NLC may be overcome, in particular low accuracy, high THD, high switching losses, temperature imbalances, reduced lifetime and danger of device destruction. The advantages of the improved concept allow an efficient operation of an MMC for a greater range of submodules or cells per arm. In particular, the improved concept may be most beneficial for a low or medium number of submodules per arm, for example five to 100 submodules per arm or 5 to 50 submodules per arm or 10 to 15 submodules per arm.

The improved concept therefore makes it possible to exploit the advantages of an MMC's controllability without significant disadvantages of the controllability. In particular, the management of thermal stress, which is vital regarding reliability and lifetime of the MMC, is addressed in a beneficial way.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

CU control unit
A, Au1, Au2, Au3 arms
Al1, Al2, Al3
Lu1, Lu2, Lu3, inductive components
Ll1, Ll2, Ll3
k, k1, k2, k3 switches
R resistor
PAC, PDC ports
P1, P2, P3 terminals of AC port
SM, SM1, SM2, SM3, SMN submodules
S1, S2 switching elements
T1, T2 input and output terminal
I1, I2 transistors
D1, D2 diodes
C capacitor

The invention claimed is:

1. A method for operating a modular multilevel converter (MMC), the method comprising controlling a plurality of submodules of an arm of the MMC for a plurality of subsequent periods, each of the plurality of submodules comprising a respective capacitor, wherein the controlling operation comprises, for each of the subsequent periods:
   sampling a value of a reference voltage;
   determining an integer number n of submodules of the plurality of submodules required to approximate the sampled value;
   for each submodule of a subset of the n submodules of the plurality of submodules, determining a temperature characterizing the respective submodule;
   inserting all submodules of the subset of the n submodules except for one remaining submodule;
   determining, depending on the determined temperatures, a duty ratio; and
   inserting the one remaining submodule for a duration given by the duty ratio,
   wherein a minimum temperature of the determined temperatures is identified and the duty ratio is determined depending on the minimum temperature.

2. The method according to claim 1, wherein the temperature characterizing the respective submodule is given by a junction temperature of a switching element of the respective submodule.

3. The method according to claim 1, wherein each submodule of the plurality of submodules comprises a switching arrangement for inserting, bypassing, or blocking the respective submodule.

4. The method according to claim 3, wherein:
   the switching arrangement of one of the plurality of submodules comprises a first switching element and a second switching element; and
   the first switching element, the second switching element, and the capacitor of the respective submodule are arranged according to a half-bridge topology.

5. The method according to claim 4, wherein, for inserting one of the plurality of submodules, the first switching element of the respective submodule is closed and the second switching element of the respective submodule is opened, such that the capacitor of the respective submodule is charged or discharged.

6. The method according to claim 1 further comprising:
   sorting the plurality of submodules either in ascending order or in descending order with respect to voltages across the respective capacitor of each of the plurality of submodules; and
   generating a sorted list of submodules based on the sorting;
   wherein the subset of n submodules corresponds to a first n entries of the sorted list.

7. The method according to claim 6,
   the method further comprising determining a temperature difference between a minimum temperature of the determined temperatures characterizing the submodules and the determined temperature characterizing a reference submodule of the sorted list; and
   wherein, upon the temperature difference being determined to be greater than a predetermined threshold value, the one remaining submodule is a submodule, of the subset of the n submodules, for which the minimum temperature has been determined.

8. The method according to claim 6,
   the method further comprising determining a temperature difference between a minimum temperature of the determined temperatures characterizing the submodules and the determined temperature characterizing a reference submodule of the sorted list; and
   wherein upon determining that the temperature difference is smaller than a predetermined threshold value, the one remaining submodule is the reference submodule of the subset of the n submodules.

9. A modular multilevel converter, the modular multilevel converter comprising a control unit and an arm with a plurality of submodules; wherein:
   each of the plurality of submodules comprises a respective capacitor; and
   the control unit is configured to, for each of a plurality of subsequent periods:
   sample a value of a reference voltage;
   determine an integer number n of submodules of the plurality of submodules required to approximate the sampled value;
   for each submodule of a subset of the n submodules of the plurality of submodules, determine a temperature characterizing the respective submodule;
   insert all submodules of the subset of the n submodules except for one remaining submodule;
   determine, depending on the determined temperatures, a duty ratio; and
   inserting the one remaining submodule for a duration given by the duty ratio,
   wherein a minimum temperature of the determined temperatures is identified and the duty ratio is determined depending on the minimum temperature.

10. The modular multilevel converter according to claim 9, wherein each of the plurality of submodules comprises a respective switching arrangement configured to insert, bypass, and block the respective submodule.

11. The modular multilevel converter according to claim 10, wherein:

the switching arrangement of one of the plurality of submodules comprises a first switching element and a second switching element;

the first switching element, the second switching element, and the capacitor of the respective submodule are arranged according to a half-bridge topology.

12. The modular multilevel converter according to claim 11, wherein the control unit is configured to, for inserting one of the plurality of submodules, close the first switching element and open the second switching element of the respective submodule such that the capacitor of the respective submodule is capable of being charged or discharged.

13. The modular multilevel converter according to claim 10, wherein the switching arrangement of one of the submodules comprises at least one insulated gate bipolar transistor.

* * * * *